(12) United States Patent
Lee et al.

(10) Patent No.: US 12,018,889 B2
(45) Date of Patent: Jun. 25, 2024

(54) METHOD AND SYSTEM FOR DRYING ELECTRODE PLATE OF SECONDARY BATTERY

(71) Applicant: SK INNOVATION CO., LTD., Seoul (KR)

(72) Inventors: Sang Hwa Lee, Daejeon (KR); Sung Woo Kim, Daejeon (KR); Hoe Sun Jeong, Daejeon (KR); Ju Hyun Kim, Daejeon (KR)

(73) Assignee: SK ON CO., LTD., Seoul (KR)

(*) Notice: Subject to any disclaimer, the term of this patent is extended or adjusted under 35 U.S.C. 154(b) by 353 days.

(21) Appl. No.: 17/367,711

(22) Filed: Jul. 6, 2021

(65) Prior Publication Data

US 2022/0006066 A1 Jan. 6, 2022

(30) Foreign Application Priority Data

Jul. 6, 2020 (KR) .................. 10-2020-0082516

(51) Int. Cl.
*F26B 21/10* (2006.01)
*F26B 3/02* (2006.01)
(Continued)

(52) U.S. Cl.
CPC .............. *F26B 21/10* (2013.01); *F26B 3/02* (2013.01); *F26B 3/04* (2013.01); *F26B 21/06* (2013.01); *F26B 21/12* (2013.01); *H01M 4/23* (2013.01)

(58) Field of Classification Search
CPC .... F26B 21/10; F26B 3/02; F26B 3/04; F26B 21/06; F26B 21/12; H01M 4/23
(Continued)

(56) References Cited

U.S. PATENT DOCUMENTS

| | | | |
|---|---|---|---|
| 2,062,193 A * | 11/1936 | Smith | H01M 4/21 134/72 |
| 3,328,893 A * | 7/1967 | Schilling | H01M 4/23 34/225 |

(Continued)

FOREIGN PATENT DOCUMENTS

| | | |
|---|---|---|
| CN | 207456051 U | 6/2018 |
| JP | 5798144 B2 | 10/2015 |

(Continued)

OTHER PUBLICATIONS

Office Action for the Korean Patent Application No. 10-2020-0082516 issued by the Korean Intellectual Property Office on Dec. 20, 2023.

*Primary Examiner* — Stephen M Gravini
(74) *Attorney, Agent, or Firm* — IP & T GROUP LLP (57) ABSTRACT

The present invention relates to a method for drying an electrode plate capable of solving an electrode plate overdrying problem and a drying uniformity deterioration problem due to a pressure change by including: a supply air volume setting step of setting an initial supply air volume introduced into a drier to a target air volume or less; an exhaust air volume setting step of setting an initial exhaust air volume to a numerical value corresponding to the initial supply air volume set in the supply air volume setting step; and an air volume adjusting step of increasing a supply air volume and an exhaust air volume from the initial air volumes set in the supply air volume setting step and the exhaust air volume setting step to designated target air volumes for a predetermined time, and a system for drying an electrode plate capable of effectively implementing the same.

7 Claims, 6 Drawing Sheets

(51) Int. Cl.
*F26B 3/04* (2006.01)
*F26B 21/06* (2006.01)
*F26B 21/12* (2006.01)
*H01M 4/23* (2006.01)

(58) Field of Classification Search
USPC .......................................................... 34/493
See application file for complete search history.

(56) References Cited

U.S. PATENT DOCUMENTS

| | | | | |
|---|---|---|---|---|
| 3,838,526 A | * | 10/1974 | McAlpine | F26B 15/12 |
| | | | | 34/418 |
| 3,943,002 A | * | 3/1976 | Scheuerle | F26B 3/04 |
| | | | | 34/443 |
| 5,911,487 A | * | 6/1999 | Dricken | F26B 5/04 |
| | | | | 34/92 |
| 7,987,613 B2 | * | 8/2011 | Ness | C10L 9/08 |
| | | | | 34/138 |
| 8,056,252 B2 | * | 11/2011 | Fernandes | F24F 3/153 |
| | | | | 261/153 |
| 10,184,717 B2 | * | 1/2019 | Heo | F26B 21/04 |
| 11,384,980 B2 | * | 7/2022 | Triglia, Jr. | F26B 13/008 |
| 11,670,751 B2 | * | 6/2023 | Lee | F26B 21/10 |
| | | | | 34/337 |
| 2022/0006066 A1 | * | 1/2022 | Lee | H01M 4/0471 |

FOREIGN PATENT DOCUMENTS

| | | | |
|---|---|---|---|
| JP | 2015-219949 A | 12/2015 | |
| KR | 10-1475429 B1 | 12/2014 | |
| KR | 10-2015-0131561 A | 11/2015 | |
| KR | 10-2015-0131563 A | 11/2015 | |
| KR | 20160034796 A | 3/2016 | |
| KR | 10-1746138 B1 | 6/2017 | |
| KR | 10-2018-0069388 A | 6/2018 | |
| WO | WO-2006044353 A2 * | 4/2006 | ............... C10L 9/08 |

* cited by examiner

FIG. 2A

|  | INITIAL SUPPLY AND EXHAUST AIR VOLUMES | TARGET SUPPLY AND EXHAUST AIR VOLUMES | PREPARATION TIME | ARRIVAL TIME |
|---|---|---|---|---|
| DRYER | 80% | 100% | 1min | 3min |

FIG. 2B

| STEP | FIRST STEP | SECOND STEP | THIRD STEP | FOURTH STEP | FIFTH STEP |
|---|---|---|---|---|---|
| AIR VOLUME | 80% | 85% | 90% | 95% | 100% |

FIG. 4A

|  | INITIAL SUPPLY AND EXHAUST AIR VOLUMES | TARGET SUPPLY AND EXHAUST AIR VOLUMES | PREPARATION TIME | ARRIVAL TIME |
|---|---|---|---|---|
| DRYER | 80% | 100% | 1min | 4min |

FIG. 4B

|  | FIRST STEP | SECOND STEP | THIRD STEP | FOURTH STEP |
|---|---|---|---|---|
| SUPPLY AND EXHAUST AIR VOLUMES | 80% | 85% | 90% | 100% |
| AMOUNT OF SUPPLED HOT OIL | 70% | 80% | 90% | 100% |

METHOD AND SYSTEM FOR DRYING ELECTRODE PLATE OF SECONDARY BATTERY

CROSS-REFERENCE TO RELATED APPLICATIONS

This application claims priority under 35 U.S.C. § 119 to Korean Patent Application No. 10-2020-0082516, filed on Jul. 6, 2020, in the Korean Intellectual Property Office, the disclosure of which is incorporated herein by reference in its entirety.

TECHNICAL FIELD

The following disclosure relates to a method and a system for drying an electrode plate of a secondary battery, and more particularly, to a method for drying an electrode plate capable of preventing an overdrying phenomenon of the electrode plate and maintaining drying uniformity through adjustment of a flow rate, and a system for drying an electrode plate using the same.

BACKGROUND

In drying of an electrode plate of a secondary battery, largely, a combination of heat amount drying that dries a solvent at a determined temperature and air volume without a change over time and concentration drying that changes a temperature and air volume according to a fluctuation in a solvent saturation amount in a drying furnace is used. However, in an initial state of drying when the solvent saturation amount in the drying furnace is 0, a concentration drying amount is large, such that overdrying occurs temporarily, and even at the time of restarting a system after a pause, the concentration drying amount is large, such that a defect due to overdrying occurs for a predetermined time.

In most of the current drying furnaces, a drying condition is set at a constant drying temperature and air volume at each drier, and the electrode plate is dried in a state in which the temperature and the air volume are maintained to be constant. Therefore, overdrying due to the concentration drying occurred at the initial stage of drying, such that a crack of the electrode plate, brokenness of the electrode plate, an increase in electrode resistance due to binder migration, and the like, occurred, and thus, there was a problem that a quality of the dried electrode plate is deteriorated.

At the time of adjusting the air volume introduced into the drier in order to prevent such overdrying, a pressure inside the drier is varied according to the air volume introduced into the drier, and thus, there was a problem that drying uniformity is deteriorated, and a flow rate of hot oil adjusting a temperature of the air volume introduced into the drier is also varied, such that there was also a problem such as a hunting phenomenon in which a temperature is unstably fluctuated. Therefore, there is a need to develop a new method for drying an electrode plate capable of solving such problems, and a system for drying an electrode plate optimized for execution of the method for drying an electrode plate.

RELATED ART DOCUMENT

Patent Document

Korean Patent Laid-Open Publication No. 10-2018-0069388 (entitled "Drying Apparatus for Electrode" and published on Jun. 25, 2018)

SUMMARY

An embodiment of the present invention is directed to providing a method for drying an electrode plate capable of solving a problem that a quality of the electrode plate is deteriorated due to brokenness of the electrode plate or a crack of the electrode plate caused by overdrying at the initial stage of drying, and a system for drying an electrode plate optimized for the same.

Another embodiment of the present invention is directed to providing a method for drying an electrode plate capable of solving a problem that drying uniformity is deteriorated due to a variation of a pressure inside a drier at the time of adjusting an air volume introduced into the drier in order to prevent overdrying, and a system for drying an electrode plate optimized for the same.

Still another embodiment of the present invention is directed to providing a method for drying an electrode plate capable of preventing a temperature hunting phenomenon occurring due to a variation of a flow rate of hot oil adjusting a temperature of an air volume, and a system for drying an electrode plate optimized for the same.

In one general aspect, a method for drying an electrode plate includes: a supply air volume setting step (S100) of setting an initial supply air volume introduced into a drier to a target air volume or less; an exhaust air volume setting step (S200) of setting an initial exhaust air volume to a numerical value corresponding to the initial supply air volume set in the supply air volume setting step (S100); and an air volume adjusting step (S300) of increasing a supply air volume and an exhaust air volume from the initial air volumes set in the supply air volume setting step (S100) and the exhaust air volume setting step (S200) to designated target air volumes for a predetermined time.

The initial supply air volume in the supply air volume setting step (S100) and the initial exhaust air volume in the exhaust air volume setting step (S200) may be set to be the same as each other.

The increase in the supply air volume and the increase in the exhaust air volume in the air volume adjusting step (S300) may be stepwise performed with a time difference therebetween.

The method for drying an electrode plate may further include an air volume adjustment information calculating step (S400) of generating a plurality of air volume increasing steps on the basis of initial supply air volume information input in the supply air volume setting step (S100), initial exhaust air volume information input in the exhaust air volume setting step (S200), and set preparation time and arrival time information and determining a holding time of each air volume increasing step.

The method for drying an electrode plate may further include a temperature control information obtaining step (S500) of calculating a heating fluid flow rate suitable for each air volume increasing step determined in the air volume adjustment information calculating step (S400).

The method for drying an electrode plate may further include a temperature adjusting step (S600) of adjusting the heating fluid flow rate to a numerical value corresponding to an air volume increasing step change using heating fluid flow rate information for each step obtained in the temperature control information obtaining step (S500).

In another general aspect, a system for drying an electrode plate includes: a fluid feeder 100 through which a fluid is introduced; a heater 200 heating the fluid supplied through the fluid feeder 100; a drier 300 receiving the fluid heated through the heater 200 and drying the electrode plate; a discharger 400 through which the fluid used in the drier 300 is discharged; and a controller 500 stepwise adjusting amounts of fluid introduced through the fluid feeder 100 and fluid discharged through the discharger 400 and a heat amount of the heater 200 from designated initial numerical values to target numerical values.

The controller 500 may set the initial supply air volume and the initial exhaust air volume to be the same as each other.

The controller 500 may stepwise perform the increase in the supply air volume and the increase in the exhaust air volume at the time of adjusting an air volume with a time difference therebetween.

The controller 500 may further include an air volume adjustment information calculator generating a plurality of air volume increasing steps on the basis of initial supply air volume information input at the time of setting a supply air volume, initial exhaust air volume information input at the time of setting an exhaust air volume, and set preparation time and arrival time information and determining a holding time of each air volume increasing step.

The controller 500 may further include a temperature control information obtainer calculating a heating fluid flow rate suitable for each air volume increasing step determined in the air volume adjustment information calculator.

The controller 500 may adjust the heating fluid flow rate to a numerical value corresponding to an air volume increasing step change using heating fluid flow rate information for each step obtained in the temperature control information obtainer.

DETAILED DESCRIPTION OF MAIN ELEMENTS

100: fluid feeder
200: heater
300: drier
400: discharger
500: controller
S100: supply air volume setting step
S200: exhaust air volume setting step
S300: air volume adjusting step
S400: air volume adjustment information calculating step
S500: temperature control information obtaining step
S600: temperature adjusting step

DETAILED DESCRIPTION OF EMBODIMENTS

Various advantages and features of embodiments of the present invention and methods accomplishing them will become apparent from the following detailed description of exemplary embodiments with reference to the accompanying drawings. However, the present invention is not limited to embodiments to be described below, but may be implemented in various different forms, these embodiments will be provided only in order to make the present invention complete and allow those skilled in the art to completely recognize the scope of the present invention, and the present invention will be defined by the scope of the claims. Throughout the specification, the same reference numerals denote the same components.

In describing exemplary embodiments of the present invention, when it is decided that a detailed description for well-known functions and configurations may unnecessarily obscure the gist of the present invention, the detailed description will be omitted. In addition, the following terms are terms defined in consideration of the functions in exemplary embodiments of the present invention, and may be construed in different ways by the intention of users and operators, customs, or the like. Therefore, these terms should be defined on the basis of contents throughout the present specification.

Hereinafter, a method S1000 of drying an electrode plate according to the present invention will be described with reference to the accompanying drawings.

Figure 1:
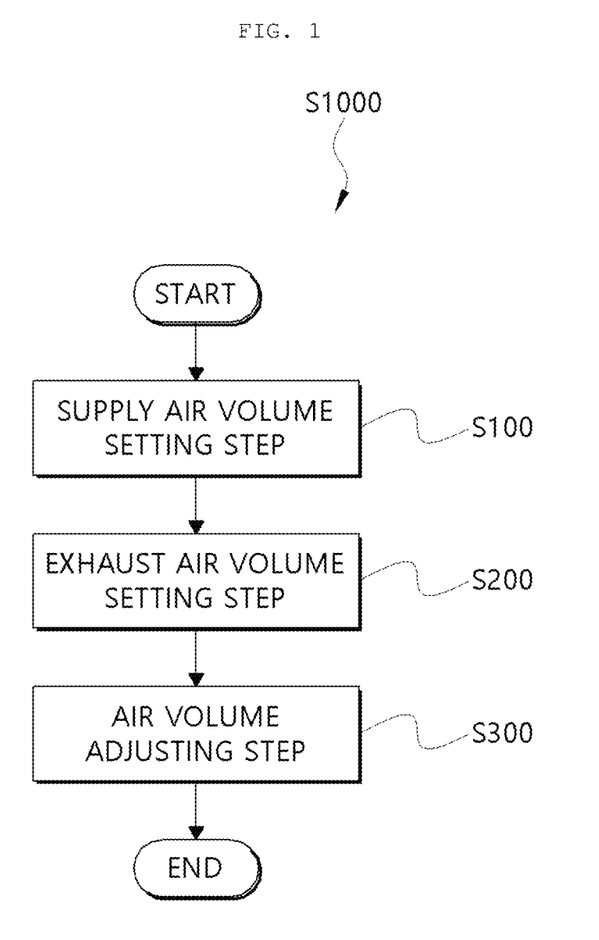
FIG. 1 is a flow chart illustrating a method for drying an electrode plate according to a first embodiment of the present invention.
Figure 2A:
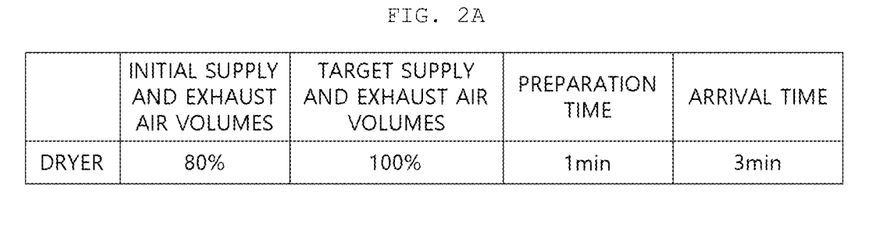
FIGS. 2A and 2B are tables for describing air volume adjustment by the method for drying an electrode plate according to the first embodiment.
Figure 2B:
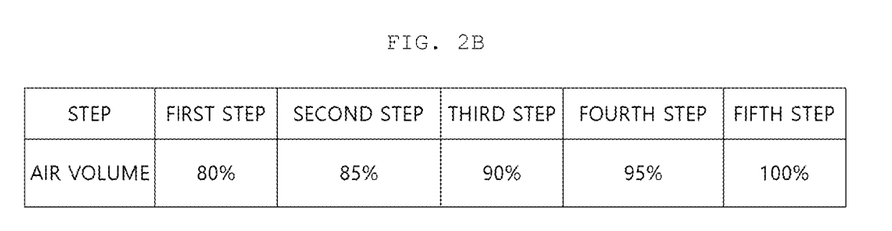

FIG. 1 is a flow chart illustrating a method S1000 for drying an electrode plate according to a first embodiment of the present invention, and FIGS. 2A and 2B are tables for describing air volume adjustment by the method S1000 for drying an electrode plate. Referring to FIG. 1, the method S1000 for drying an electrode plate according to a first embodiment of the present invention may include: a supply air volume setting step (S100) of setting an initial supply air volume introduced into a drier to a target air volume or less, an exhaust air volume setting step (S200) of setting an initial exhaust air volume to a numerical value corresponding to the initial supply air volume set in the supply air volume setting step (S100), and an air volume adjusting step (S300) of increasing a supply air volume and an exhaust air volume from the initial air volumes set in the supply air volume setting step (S100) and the exhaust air volume setting step (S200) to designated target air volumes for a predetermined time.

In detail, a heat amount drying manner using a temperature and an air volume and a concentration drying manner using a solvent saturation amount are used together for drying an electrode plate of a secondary battery. In this case, at the time of restarting a system after shutting down the system, a solvent saturation amount in the drier does not reach a designated predetermined numerical value, and thus, there is a problem that the electrode plate is overdried, resulting in a defect. Therefore, in the present invention, an overdrying problem occurring due to introduction of an excessive air volume into the drier in a state in which the solvent saturation amount in the drier does not reach the designated predetermined numerical value has been solved by adopting a manner of setting the supply air volume to the target air volume or less and then stepwise increasing the supply air volume.

However, in a case where only the air volume introduced into the drier is adjusted, an internal pressure of the drier is varied according to the air volume introduced into the drier, such that drying uniformity of the electrode plate is impaired. Therefore, in the air volume adjusting step (S300), the air volume introduced into the drier and an air volume discharged from a drying furnace are adjusted to be the same as each other.

Describing this again with reference to FIGS. 2A and 2B, when the initial supply and exhaust air volumes are set to target supply and exhaust air volumes or less on the basis of the target supply and exhaust air volumes of 100% as illustrated in FIG. 2A through the supply air volume setting step (S100) and the exhaust air volume setting step (S200), after an operation is performed with the set initial supply and exhaust air volumes during a preparation time, an air volume increase range for each step is determined according to an arrival time. Thereafter, as illustrated in FIG. 2B, the supply and exhaust air volumes are stepwise increased according to designated air volume increasing steps.

Figure 3:
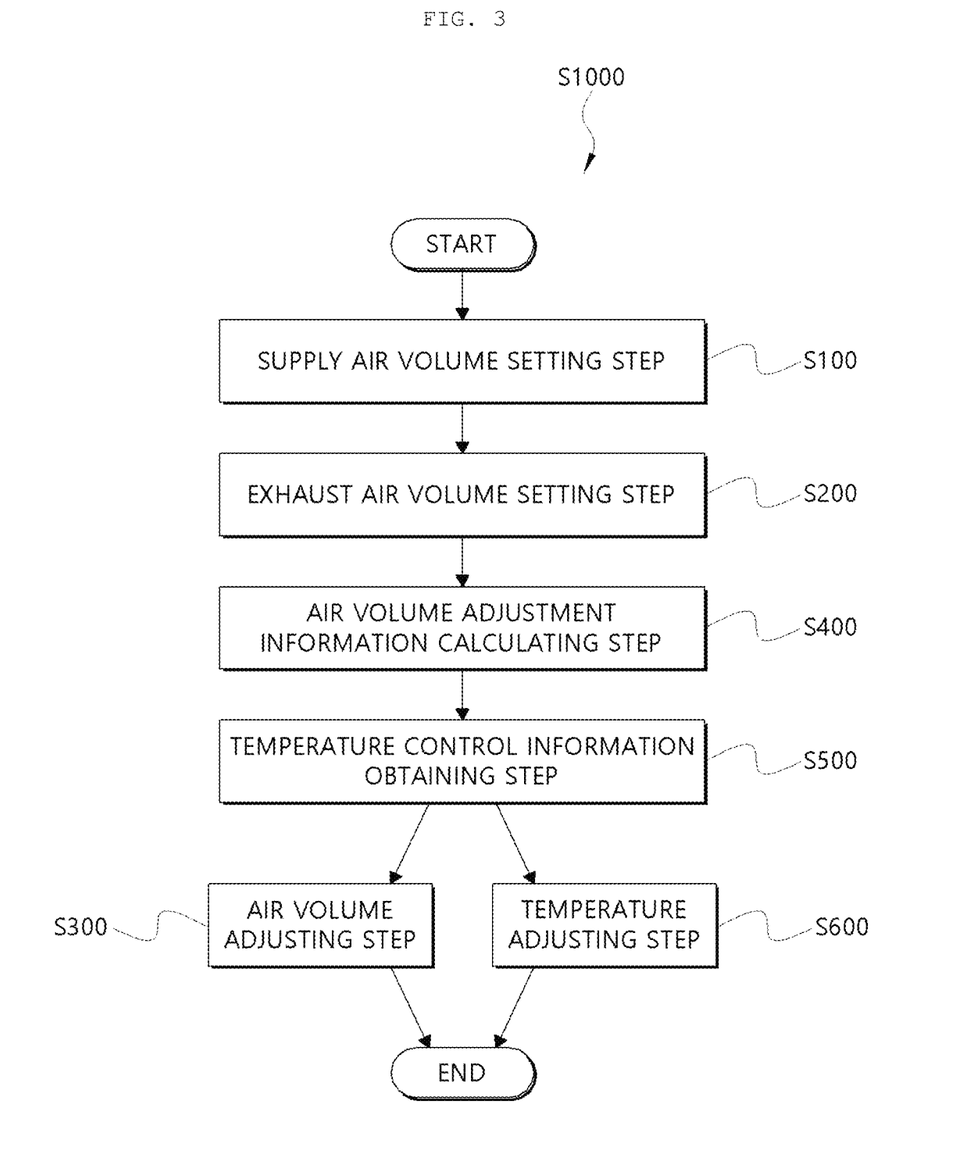
FIG. 3 is a flow chart illustrating a method for drying an electrode plate according to a second embodiment of the present invention.
Figure 4A:
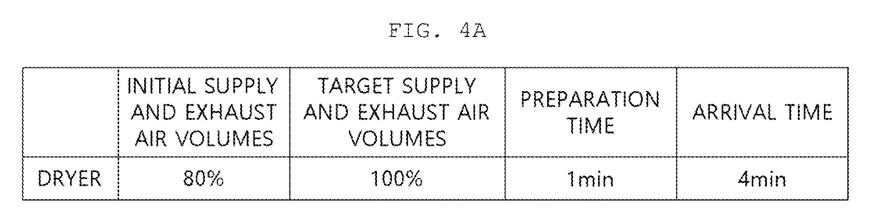
FIGS. 4A and 4B are tables for describing drying of an electrode plate using the method for drying an electrode plate according to the second embodiment of the present invention.
Figure 4B:
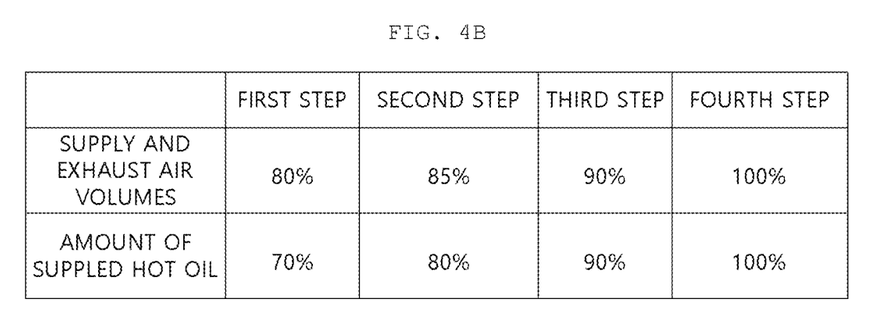

FIG. 3 is a flow chart illustrating a method S1000 for drying an electrode plate according to a second embodiment of the present invention, and FIGS. 4A and 4B are tables for describing drying of an electrode plate using the method S1000 for drying an electrode plate according to the second embodiment of the present invention. Referring to FIG. 3, the method S1000 for drying an electrode plate according to a second embodiment may further include: an air volume adjustment information calculating step (S400) of generating a plurality of air volume increasing steps on the basis of initial supply air volume information input in the supply air volume setting step (S100), initial exhaust air volume information input in the exhaust air volume setting step (S200), and input or preset preparation time and arrival time information and determining a holding time of each air volume increasing step, a temperature control information obtaining step (S500) of calculating a heating fluid flow rate suitable for each air volume increasing step determined in the air volume adjustment information calculating step (S400), and a temperature adjusting step (S600) of adjusting the heating fluid flow rate to a numerical value corresponding to an air volume increasing step change using heating fluid flow rate information for each step obtained in the temperature control information obtaining step (S500), wherein temperature adjustment of a heating fluid and adjustment of the air volume may be simultaneously performed.

In detail, the air volume described above refers to an amount of fluid supplied to the drier per unit time, and such a fluid should maintain a temperature optimized for drying the electrode plate provided on the drier in order to improve a quality of the electrode plate. However, in a case where the amount of fluid supplied to the drier continuously changes, a changing temperature of the fluid should be measured again and the temperature of the fluid should be then adjusted to a suitable temperature. Even though a control system that may minimize a fluctuation range, such as proportional integral deviation (PID) control is applied in a process of performing such a work, a hunting phenomenon in which a temperature is unstably fluctuated occurs, such that a temperature fluctuation range is large, and a gas generation concentration also becomes higher than a suitable concentration due to the large temperature fluctuation range. Therefore, in the present invention, a heating fluid flow rate requiring for maintaining a suitable temperature for each step determined in the air volume adjustment information calculating step (S400) is calculated through the temperature control information obtaining step (S500), and the heating fluid flow rate is then adjusted to a suitable numerical value corresponding to an air volume increase in the temperature adjusting step (S600).

Describing this again with reference to FIGS. 3 to 4B, when the initial supply and exhaust air volumes are set through the supply air volume setting step (S100) and the exhaust air volume setting step (S200) as illustrated in FIG. 4A, a step of adjusting the supply and exhaust air volumes is divided into a plurality of steps as illustrated in FIG. 4B on the basis of the input air volume information and the input or preset preparation time and arrival time information in the air volume adjustment information calculating step (S400), the heating fluid flow rate suitable for each of the divided steps is calculated in the temperature control information obtaining step (S500), and the adjustment of the air volume and the flow rate adjustment of the heating fluid for maintaining a temperature may then be simultaneously performed through the air volume adjusting step (S300) and the temperature adjusting step (S600).

Figure 5A:
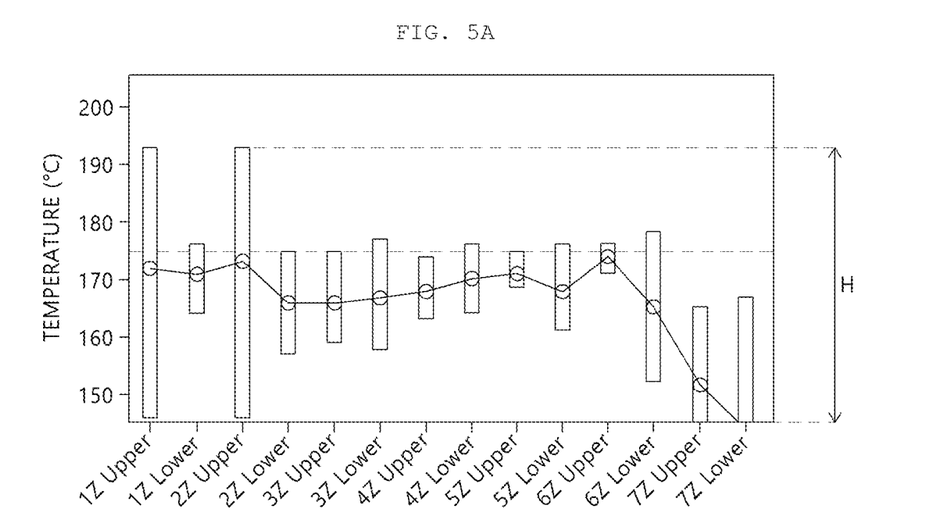
FIGS. 5A and 5B are graphs illustrating measurement results of temperatures for each position of a drier before and after using the method for drying an electrode plate according to the present invention described above.
Figure 5B:
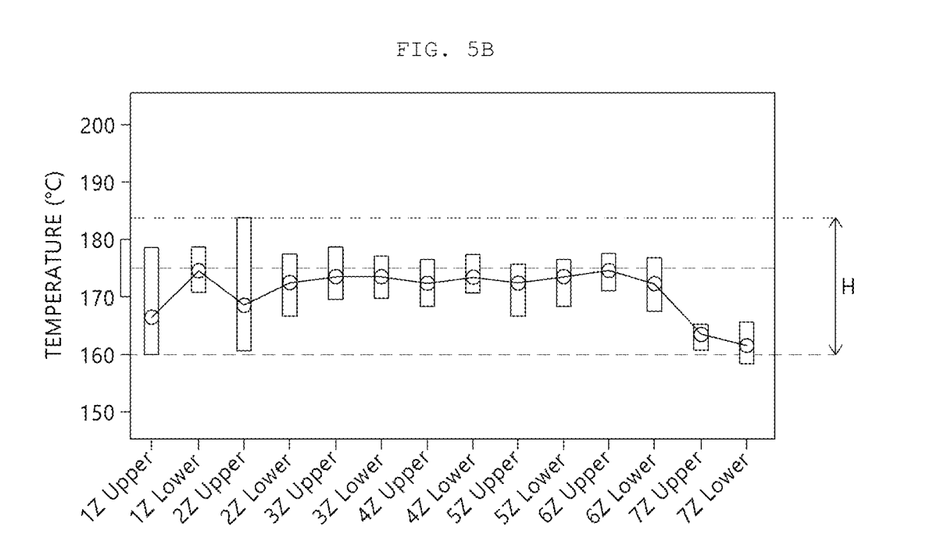
Figure 6:
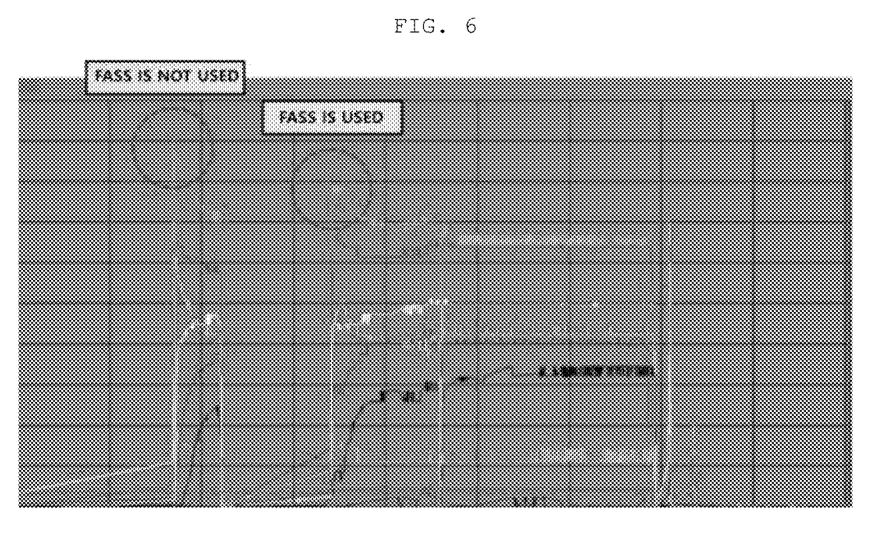
FIG. 6 is graphs illustrating measurement results of amounts of generated gas before and after using the method for drying an electrode plate according to the present invention in a drying process.

FIGS. 5A and 5B are graphs illustrating measurement results of temperatures for each position of a drier before and after using the method for drying an electrode plate according to the present invention described above, and FIG. 6 is graphs illustrating measurement results of amounts of generated gas before and after using the method for drying an electrode plate according to the present invention in a drying process. In FIG. 6, the method for drying an electrode plate according to the present invention is denoted by FASS.

It can be seen that a temperature hunting level and distribution in each zone are significantly alleviated even when an air volume in a dryer fluctuates, by applying a method for controlling a hot oil flow rate according to the present invention, when comparing FIG. 5A illustrating a temperature distribution for each zone when a method for stepwise adjusting a heating fluid flow rate is not applied with FIG. 5B illustrating a temperature distribution after calculating the heating fluid flow rate suitable for each of the plurality of divided supply and exhaust air volume adjusting steps (first step, second step, third step, and fourth step) through the temperature control information obtaining step (S500) according to the present invention and then adjusting the flow rate of the heating fluid simultaneously with adjusting the supply and exhaust air volumes through the temperature adjusting step (S600).

A temperature of a wind from the dryer is set to an amount of hot oil matched to the corresponding air volume, and when a rapid fluctuation occurs in the air volume of the dryer, the amount of hot oil may not catch up with reactivity, such that temperature hunting occurs. However, by accurately matching amounts of hot oil to be suitable for air volumes of each dryer as in the present invention, a temperature deviation between the dryers is reduced, and an amount of temperature hunting is minimized.

Figure 7:
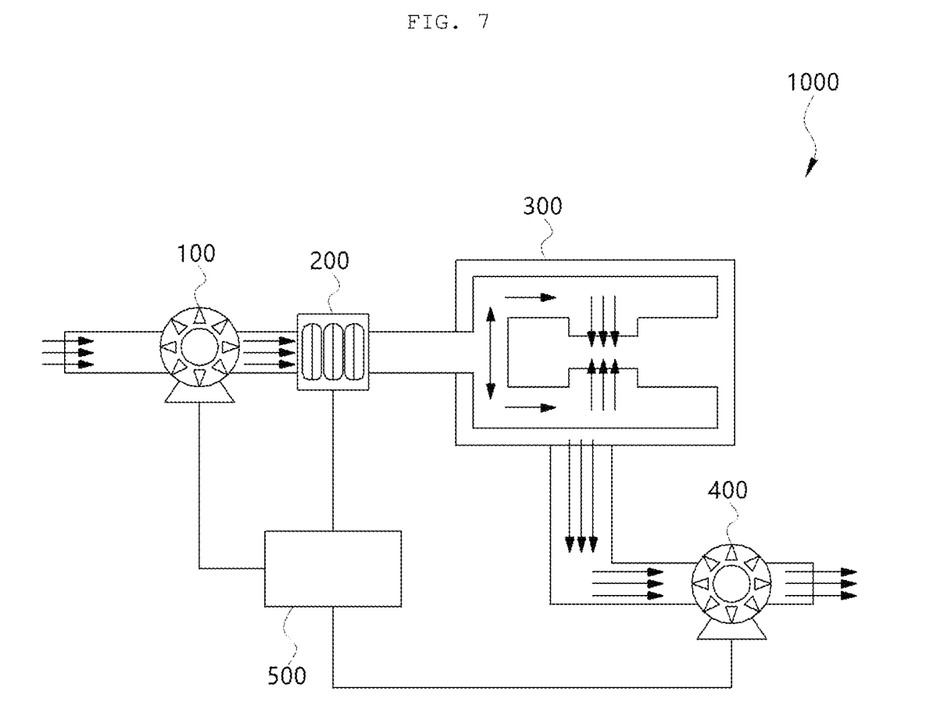
FIG. 7 is a conceptual diagram illustrating a system for drying an electrode plate according to the present invention.

FIG. 7 is a conceptual diagram illustrating a system for drying an electrode plate that may be used in the method for drying an electrode plate described above. Referring to FIG. 7, the system 1000 for drying an electrode plate according to the present invention may include a fluid feeder 100 through which a fluid is introduced, a heater 200 heating the fluid supplied through the fluid feeder 100, a drier 300 receiving the fluid heated through the heater 200 and drying the electrode plate, a discharger 400 through which the fluid used in the drier 300 is discharged, and a controller 500 stepwise adjusting amounts of fluid introduced through the fluid feeder 100 and fluid discharged through the discharger 400 and a heat amount of the heater 200 from designated initial numerical values to target numerical values.

In detail, the controller 500 may receive the initial supply and exhaust air volume information through the supply air volume setting step (S100) and the exhaust air volume setting step (S200), calculate the plurality of air volume increasing steps and air volume information suitable for each of the air volume increasing steps through the air volume adjustment information calculating step (S400), calculate the heating fluid flow rate information suitable for each air volume increasing step through the temperature control information obtaining step (S500), and then operate the fluid feeder 100, the heater 200, and the discharger 400 at designated numerical values at designated points in time to allow more correct drying of the electrode plate to be performed in each air volume increasing step.

The method and the system for drying an electrode plate according to the present invention stepwise increase the air volume introduced into the drier for a predetermined time, and may thus solve an overdrying problem occurring at the time of restarting the drier after a pause.

In addition, the supply air volume and the exhaust air volume are maintained to be the same as each other, and may thus solve a problem that drying uniformity is deteriorated due to a variation of a pressure inside the drier.

Further, an increase in a flow rate of hot oil adjusting a temperature of a fluid according to air volume stepwise increasing for a predetermined time is also stepwise adjusted, and may thus preventing a temperature hunting phenomenon occurring due to a stepwise increase in the air volume.

The present invention is not limited to the exemplary embodiments described above, but may be variously applied. In addition, the present invention may be variously modified by those skilled in the art to which the present invention pertains without departing from the gist of the present invention claimed in the claims.

What is claimed is:

1. A method for drying an electrode plate, comprising:
   a supply air volume setting step of setting an initial supply air volume introduced into a drier to a target air volume or less;
   an exhaust air volume setting step of setting an initial exhaust air volume to a numerical value corresponding to the initial supply air volume set in the supply air volume setting step; and
   an air volume adjusting step of increasing a supply air volume and an exhaust air volume from the initial supply air volume and the initial exhaust air volume respectively set in the supply air volume setting step and the exhaust air volume setting step, to designated target air volumes for a predetermined time, wherein the supply air volume and the exhaust air volume are maintained to be the same as each other.

2. The method for drying an electrode plate of claim 1, wherein the initial supply air volume in the supply air volume setting step and the initial exhaust air volume in the exhaust air volume setting step are set to be same as each other.

3. The method for drying an electrode plate of claim 2, wherein an increase in the supply air volume and an increase in the exhaust air volume in the air volume adjusting step are stepwise performed with a time difference therebetween.

4. The method for drying an electrode plate of claim 1, further comprising an air volume adjustment information calculating step of generating a plurality of air volume increasing steps on a basis of initial supply air volume information input in the supply air volume setting step, initial exhaust air volume information input in the exhaust air volume setting step, and set preparation time and arrival time information and determining a holding time of each air volume increasing step.

5. The method for drying an electrode plate of claim 4, further comprising a temperature control information obtaining step of calculating a heating fluid flow rate suitable for each air volume increasing step determined in the air volume adjustment information calculating step.

6. The method for drying an electrode plate of claim 5, further comprising a temperature adjusting step of adjusting the heating fluid flow rate to a numerical value corresponding to an air volume increasing step change using heating fluid flow rate information for each step obtained in the temperature control information obtaining step.

7. A system for drying an electrode plate, comprising:
   a fluid feeder through which a fluid is introduced;
   a heater heating the fluid supplied through the fluid feeder;
   a drier receiving the fluid heated through the heater and drying the electrode plate;
   a discharger through which the fluid used in the drier is discharged; and
   a controller stepwise adjusting amounts of fluid introduced through the fluid feeder and fluid discharged through the discharger and a heat amount of the heater from designated initial numerical values to target numerical values, wherein the amounts of fluid introduced through the fluid feeder and fluid discharged through the discharger are maintained to be the same as each other.

* * * * *